(12) United States Patent
Erwin

(10) Patent No.: US 9,074,712 B2
(45) Date of Patent: Jul. 7, 2015

(54) VALVE ASSEMBLY

(75) Inventor: Alexander Erwin, Carrickfergus (GB)

(73) Assignees: John Milligan, Coleraine (GB); William Alexander Erwin, Carrickfergus (GB)

( * ) Notice: Subject to any disclaimer, the term of this patent is extended or adjusted under 35 U.S.C. 154(b) by 67 days.

(21) Appl. No.: 13/257,512

(22) PCT Filed: Mar. 16, 2010

(86) PCT No.: PCT/EP2010/001645
§ 371 (c)(1),
(2), (4) Date: Sep. 19, 2011

(87) PCT Pub. No.: WO2010/105799
PCT Pub. Date: Sep. 23, 2010

(65) Prior Publication Data
US 2012/0006428 A1    Jan. 12, 2012

(30) Foreign Application Priority Data
Mar. 20, 2009 (GB) .................................. 0904805.9

(51) Int. Cl.
*F16L 37/23* (2006.01)
*F16L 37/107* (2006.01)
(Continued)

(52) U.S. Cl.
CPC .............. *F16L 37/107* (2013.01); *F16K 27/02* (2013.01); *F16L 37/32* (2013.01)

(58) Field of Classification Search
CPC ........ F16K 27/02; F16L 37/32; F16L 37/107; F16L 37/28; B60T 17/04
USPC .......... 137/614.04, 614.11, 614.19, 613, 861, 137/866, 886, 614, 614.06; 251/360
See application file for complete search history.

(56) References Cited

U.S. PATENT DOCUMENTS 94,715 A * 9/1869 Colvin .......................... 251/360
338,353 A * 3/1886 Morris .......................... 251/360
(Continued)

FOREIGN PATENT DOCUMENTS

GB    1359142      7/1974
WO    9109248 A1   6/1991

OTHER PUBLICATIONS

International Search Report of the International Searching Authority from corresponding Patent Cooperation Treaty (PCT) Application No. PCT/EP2010/001645, mailed Jun. 4, 2010.

*Primary Examiner* — Craig Schneider
*Assistant Examiner* — Craig J Price
(74) *Attorney, Agent, or Firm* — Gardner, Linn, Burkhart & Flory, LLP

(57) ABSTRACT

A valve assembly includes mutually opposed first and second valves, each having a casing that defines a respective through passage. The through passages include internally circumferential valve seats at contiguous ends thereof, against which respective movable valve members are biased. The respective valve members of the first and second valves engage one another when the first and second valves are brought together to urge the valve members away from their respective seats to open the first and second valves. A coupling member holds the first and second valves together, and a travel limiting element restricts the travel of at least one of the valve members in the direction away from its valve seat to prevent the other valve member from engaging its valve seat when the first and second valves are together, thus preventing the other valve from closing due to the flow of fluid through the valve assembly.

6 Claims, 2 Drawing Sheets

(51) Int. Cl.
*F16K 27/02* (2006.01)
*F16L 37/32* (2006.01)

(56) References Cited

U.S. PATENT DOCUMENTS

| | | | |
|---|---|---|---|
| 369,062 A * | 8/1887 | Kersey | 137/613 |
| 2,112,146 A * | 3/1938 | Di Giovanni | 137/614 |
| 2,896,977 A | 7/1959 | Hansen | |
| 3,289,700 A | 12/1966 | Gildone | |
| 3,851,666 A | 12/1974 | Hammond | |
| 4,998,560 A | 3/1991 | Le Devehat | |
| 5,115,836 A * | 5/1992 | Carow et al. | 137/614.04 |
| 5,141,014 A * | 8/1992 | Poli et al. | 137/614.04 |

\* cited by examiner

VALVE ASSEMBLY

FIELD OF THE INVENTION

The present invention relates to a valve assembly for use with, for example radiators or other liquid holding containers or reservoirs (hereinafter in the specification and claims simply called "reservoirs") integrated or to be integrated into a piped liquid system.

BACKGROUND OF THE INVENTION

WO 91/09248 discloses a two part radiator valve assembly for use in closing off a water supply to enable a radiator to be removed. The valve assembly has two mutually opposed valves, each of which comprises a casing in which a through passage is defined, the passages having at contiguous ends internally circumferential valve seats against which respective movable conical valve members are spring biased by respective closing springs, the valve members engaging each other when the valves are placed together to urge the valve members away from the respective valve seats to open the valves. A bayonet coupling sleeve extending between the valve casings to hold the valves together. The casing of the upper of the two valves has an extension accommodating a flow regulating control valve at its distal end, the extension having a branch to be connected to a radiator. Release of the bayonet coupling sleeve allows the valves to separate, automatically closing both valves under the action of the respective closing springs.

A problem with the abovementioned known valve assembly is that the flow rate of liquid through the aligned through passages of the valves causes a resultant force to act on the valve members. At sufficiently high flow rates, such biasing force may be sufficient to displace the valve members from their neutral, mutually open position, against the biasing force of the closing spring of the upstream valve member until the downstream valve member is brought into engagement with its valve seat, closing off flow through the valve assembly.

SUMMARY OF THE INVENTION

According to the present invention there is provided a valve assembly comprising mutually opposed first and second valves, each of which comprises a casing in which a through passage is defined, the through passages having, at contiguous ends, internally circumferential valve seats against which respective movable valve members are biased, the respective valve members of the first and second valves engaging one another when the first and second valves are brought together to urge the valve members away from their respective seats to open the first and second valves, a coupling member being provided for holding the first and second valves together wherein means are provided for limiting the travel of the valve member of at least one of the first and second valves away from its valve seat to prevent the valve member of the other of the first and second valves from engaging its valve seat when the first and second valves are together, thus preventing said other of the first and second valves from closing due to the flow of fluid through the valve assembly.

Preferably the casing of the first valve includes an extension accommodating a flow regulating control valve at its distal end, the extension having a branch to be connected to a reservoir. The control valve may be manually operable. Alternatively, the control valve may be thermostatically controlled.

Preferably the upstream valve of the first and second valves in the normal direction of flow, in use, through the valve assembly, is provided with means for limiting the travel of said upstream valve to prevent closure of the downstream valve due to the flow of fluid through the valve assembly.

In one embodiment, the travel limiting means comprises the respective biasing means of the at least one of the first and second valves. The biasing means may comprise a coil spring, wherein the dimensions of the spring are selected such that the spring becomes coil bound at said limit of travel of the associated valve member.

Preferably said coil spring acts between a face of the associated valve member and a spring seat located within the respective through passage of said at least one of the first and second valves. Preferably at least one flow passage is provided through or around the spring seat to allow fluid to flow through the valve assembly when the spring is coil bound. In one embodiment, the spring seat comprises an elongate member extending between the inner sides of the through passage. Preferably said elongate member is provided with a through hole for receiving a spring supporting extension the respective valve member. The spring seat may be retained in place with the associated through passage by means of a retaining member located within the through passage. The retaining member may comprise a circlip or a threaded member.

Where the first valve is provided with a return spring adapted to define a travel limiting means, the spring seat may be retained in place by a valve seat of the flow regulating control valve, said valve seat being removably mounted within the through passage of the first valve to allow insertion and removal of the spring seat. The valve seat of the flow regulating valve may be threadedly retained within the through passage or may be retained in place by a suitable retaining means, such as a circlip.

Preferably, the coupling member is a collar which is rotatable and axially fast or substantially so around the casing of one of the first and second valves. One of the casing of the other of said first and second valves and the inner face of the outer end of the collar having two or more bayonets extending radially therefrom to engage with slots provided in the other of the inner face of the outer end of the collar or the casing of the other of the first and second valves.

BRIEF DESCRIPTION OF THE DRAWINGS

An embodiment of the present invention will now be described, by way of example, with reference to the accompanying drawings, in which:—

DETAILED DESCRIPTION OF THE PREFERRED EMBODIMENTS

Figure 1:
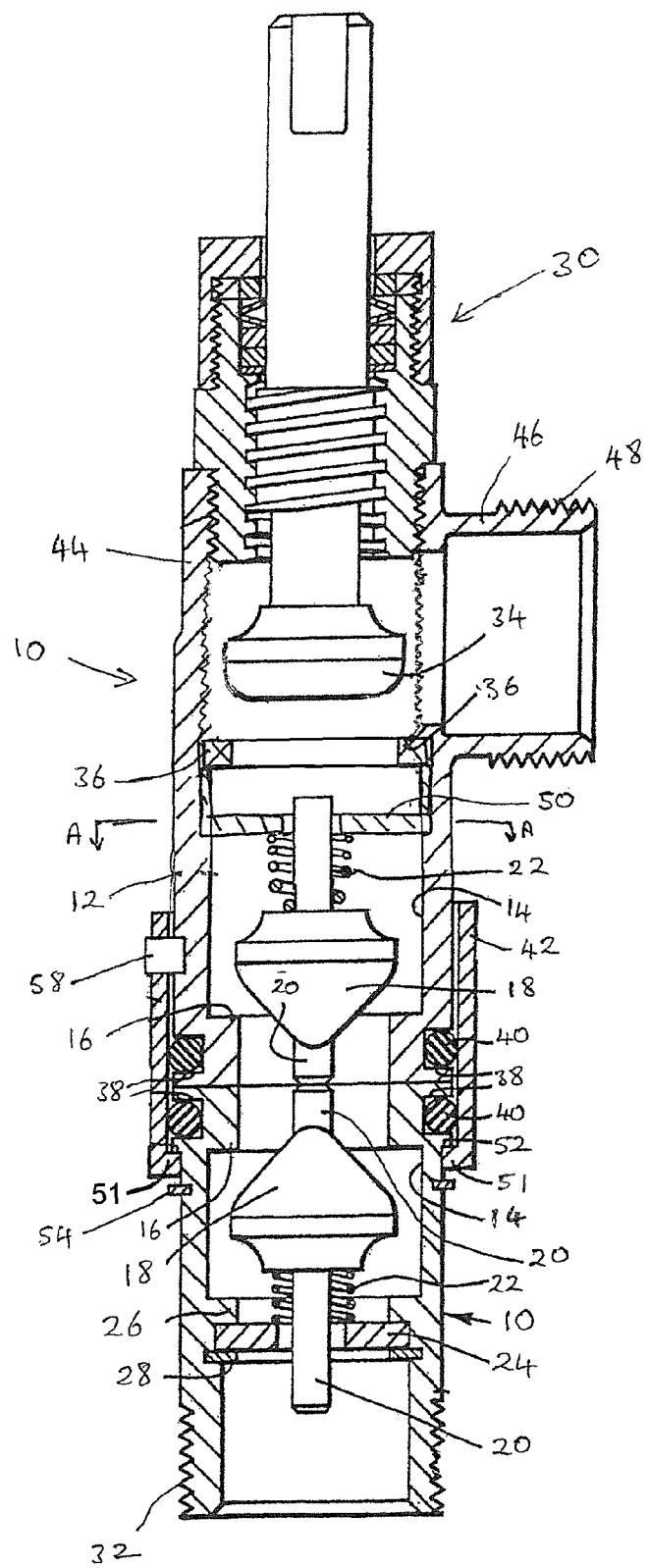
FIG. 1 is a vertical cross-sectional view of a valve assembly according to the present invention, the assembly having a manually-operable flow regulating control valve.

Referring to FIG. 1 of the drawings, a valve assembly includes two mutually opposed elongate valves 10 in a lengthwise relationship. Each valve 10 comprises a tubular casing 12 in which a through passage 14 is defined. The passage 14 of each valve has at one end, i.e. the end to which the other valve 10 is to be connected, an internally circumferential valve seat 16 against which a movable valve member 18 is spring biased by a return spring 22.

The valve member 18 of each valve is a poppet valve which is conical in shape and may be of rubber or other suitable synthetic plastics material. Each valve member 18 has a spigot device 20 centrally thereof with part of the spigot device 20 projecting outwardly of said one end to extend under the influence of the respective return spring 22 beyond the contiguous end of the casing 12. Each return spring comprises a helical compression spring 22 located within a respective through passage 23 and acting between the respective valve member 18 and a spring seat 24,50.

The contiguous ends of the valves 10 are coupled together by a coupling member providing each contiguous end with a seal gland, namely an external groove 38 into which an O-ring 40 is positioned. The coupling member comprises a collar 42 mounted around the lower valve casing 12.

The collar 42 has an internally extending flange 51 which abuts a peripheral stop 52 on the casing 12 and has a free rotational movement but a restricted axial movement between said stop 52 and abutment against a circlip 54 provided in a peripheral groove on the outside of the casing 12 as shown. The collar 42 holds the two valves 10 together, and is locked by two or more spaced bayonet connections engaging with a respective bayonet 58. The lower valve 10 and collar 42 serves as a female part of the assembly and the upper valve as the male part of the assembly.

In the lower of the two valves as shown in FIG. 1, the return spring 22 extends between the rear of the member 18 and an annular retaining plate 24, defining said spring seat, which is held in position against a collar 26, integral with the casing 12, by a circlip 28. The other end of the spigot 20 extends, as shown, through the hole in the plate 24 when the valve member 18 is out of its seat. The other end of the casing 12 of the lower valve 10 terminates with an external screw thread 32 to allow the valve assembly to be integrated into a piped liquid system.

The casing 12 of the upper valve 10 as shown in FIG. 1, is extended to accommodate a flow regulating control valve 30 at its other end. The extension 44 terminates with an internal screw-thread into which a manually-operable control valve 30 is fitted. A valve member 34 of the control valve 30 can be manually screwed into abutment with a valve seat 36 provided internally of the respective casing 12. The extension 44 has a branch 46 having an external screw thread 48 to allow the assembly to be connected to a reservoir. When the control valve 30 is in a closed position, i.e. with the member 34 in abutment in the seat 36, the through passage 14 in the respective casing 12 is closed off.

Figure 2:
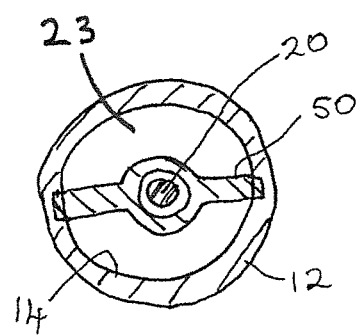
FIG. 2 is a transverse cross sectional view of the valve assembly of FIG. 1 on line A-A.

The return spring 22 of the upper valve 10 extends between the rear of the valve member 18 and a spring seat 50 located within the through passage 14 and retained in place by the valve seat 36 of the flow regulating control valve 30. Thus the return spring 22 of the upper valve 10 operates independently of the flow regulating control valve 30. As shown in FIG. 2, the flow passage 23 is defined around the spring seat 50.

The dimensions of the return springs 22 are selected so that the springs become coil bound to limit the travel of the respective valve member 18 away from its valve seat 16. As shown in FIG. 1, when the valves 10 are coupled together, the valve members 18 adopt a neutral open position, with each valve member urged to an open position by the action of the opposing valve member against the biasing force of the respective return spring 22.

The return spring 22 of each of the upper and lower valves 10 limits further movement of the respective valve member 18 away from its valve seat 16, preventing the opposing valve member 18 from being pushed into contact with its respective valve seat 16, thus limiting the movement of the valve members 18 away from their neutral open position and preventing either of the valve members 18 from closing the through passage under the action of fluid flowing through the aligned through passages 14.

This invention is advantageous in that it allows for ready removal of reservoirs without the hitherto disadvantages. Also in a domestic situation, several pipes for fitment for radiator(s) be provided whereby the positioning of the radiator(s) be altered to suit the housewife's requirements in furnishings and decoration. In an industrial situation, the reservoirs may contain other liquids such as milk, beverages or chemicals. Also, for a water system, a water storage tank may constitute the reservoir.

While in the preferred embodiment, the return springs of the valves are utilised to limit the travel of the valve members away from their respective seats, other travel limiting means are envisaged. For example, radially inwardly projecting stop members may be provided on the inner sides of the respective valve casings 12 for limiting the travel of the valve members.

The invention is not limited to the embodiment(s) described herein but can be amended or modified without departing from the scope of the present invention.

The invention claimed is:

1. A valve assembly comprising:
   mutually opposed first and second valves, each of which comprises a respective casing in which a respective through passage is defined, the through passages having, at contiguous ends, internally circumferential valve seats against which respective movable valve members are biased, the respective valve members of the first and second valves engaging one another when the first and second valves are brought together to urge the valve members away from their respective valve seats to open the first and second valves;
   a coupling member configured for holding the first and second valves together;
   a travel limiting element at each valve member of the first and second valves, wherein each travel limiting element is configured to limit travel of the respective valve member away from the respective valve seat and to prevent the opposing valve member from being pushed into contact with its respective valve seat when the first and second valves are together, to thereby prevent either of the first and second valves from closing due to the flow of fluid through the valve assembly;
   wherein each travel limiting element comprises a coil spring for biasing the respective valve member towards the respective valve seat thereof, and the dimensions of each coil spring are selected such that the coil springs become coil bound at the respective limit of travel of the respective valve member;
   wherein the casing of the first valve comprises an extension accommodating a flow regulating control valve at a distal end of the casing, the extension having a branch to be connected to a reservoir, wherein the coil spring of the first valve acts between a face of the respective valve member and a spring seat located within the through passage of the first valve;
   wherein the spring seat is retained in place by a control valve seat of the flow regulating control valve, the control valve seat being removably mounted within the through passage of the first valve to allow insertion and removal of the spring seat; and
   wherein the coil spring of the first valve is operable independently of the flow regulating control valve.

2. A valve assembly as claimed in claim 1, wherein the control valve is manually operable.

3. A valve assembly as claimed in claim 1, comprising another spring seat within the through passage of the second valve, wherein at least one flow passage is provided through or around each of said spring seats to allow fluid to flow through the valve assembly when the respective coil spring is coil bound.

4. A valve assembly as claimed in claim 1, wherein the spring seat comprises an elongate member extending between inner sides of the through passage of the casing.

5. A valve assembly as claimed in claim 4, wherein the elongate member is provided with a through hole for receiving a spring supporting extension of the valve member of the first valve.

6. A valve assembly as claimed in claim 1, wherein the valve seat of the flow regulating valve is threadedly retained within the through passage of the first valve or is retained in place by a circlip.

* * * * *